United States Patent [19]

Coviello et al.

[11] Patent Number: 4,631,367
[45] Date of Patent: Dec. 23, 1986

[54] MULTI-LINE TELEPHONE SYSTEM

[75] Inventors: Frank Coviello, Peekskill; Michael Antico, Northport, both of N.Y.

[73] Assignee: Lantel International Corp., Export, Pa.

[21] Appl. No.: 645,450

[22] Filed: Aug. 29, 1984

[51] Int. Cl.$^4$ .................................................. H04Q 5/20
[52] U.S. Cl. .................................. 379/157; 379/162; 379/164
[58] Field of Search .................... 370/67, 86, 87, 88, 370/89, 90; 179/18 AD, 99 R, 99 A, 99 E, 99 H, 99 LC, 99 LS, 99 M, 99 P

[56] References Cited

U.S. PATENT DOCUMENTS

| | | | |
|---|---|---|---|
| 3,723,971 | 3/1973 | Betts et al. | 370/86 |
| 3,781,478 | 12/1973 | Blahut et al. | 370/86 |
| 4,004,106 | 1/1977 | Yachabach et al. | 179/99 |
| 4,013,844 | 3/1977 | Saxon | 179/99 |
| 4,021,622 | 5/1977 | O'Neill et al. | 179/99 LC |
| 4,024,353 | 5/1977 | Hijikata | 179/99 LC |
| 4,029,909 | 6/1977 | Hinkle | 179/99 |
| 4,039,757 | 8/1977 | Frisone | 370/88 |
| 4,064,373 | 12/1977 | Pinede et al. | 179/99 LC |
| 4,071,712 | 1/1978 | Barsellotti | 179/99 LC |
| 4,079,212 | 3/1978 | Sasai | 179/99 |
| 4,080,517 | 3/1978 | Moricca et al. | 179/99 |
| 4,088,846 | 5/1978 | McEowen | 179/99 |
| 4,093,830 | 6/1978 | Pappas | 179/99 |
| 4,101,741 | 7/1978 | Kunstatter | 179/99 |
| 4,144,410 | 3/1979 | Flickinger et al. | 370/88 |
| 4,150,260 | 4/1979 | Kamata | 179/81 R |
| 4,185,173 | 1/1980 | Kerman et al. | 179/99 P |
| 4,198,547 | 4/1980 | Ferraro | 179/16 H |
| 4,207,439 | 5/1980 | Saxon | 179/99 LC |
| 4,214,130 | 7/1980 | Questad | 179/81 R |
| 4,220,827 | 9/1980 | Burke et al. | 179/99 LC |
| 4,223,186 | 9/1980 | Hartman | 179/90 H |
| 4,243,844 | 1/1981 | Waldman | 179/81 R |
| 4,260,857 | 4/1981 | Shinoi et al. | 179/99 R |
| 4,280,022 | 7/1981 | Sekiguchi et al. | 179/99 A |
| 4,292,474 | 9/1981 | Morrell et al. | 179/99 M |
| 4,323,734 | 4/1982 | Kimzey | 179/18 FA |
| 4,327,256 | 5/1982 | Crooks et al. | . |
| 4,347,409 | 8/1982 | Ogawa et al. | 179/99 P |
| 4,347,605 | 8/1982 | Hashizume et al. | 370/88 |
| 4,374,308 | 2/1983 | Holesha | 179/99 LS |
| 4,380,688 | 4/1983 | Simokat | 179/84 R |
| 4,381,427 | 4/1983 | Cheal et al. | 179/2 DP |
| 4,382,163 | 5/1983 | White et al. | 179/99 LC |
| 4,408,102 | 10/1983 | Lumpkin | 179/99 H |
| 4,410,767 | 10/1983 | Sekiguchi | 179/99 R |
| 4,417,242 | 11/1983 | Bapst et al. | 340/825.05 |
| 4,490,583 | 12/1984 | Beomarz et al. | 179/99 P |
| 4,511,767 | 4/1985 | Wetzel et al. | 179/99 A |
| 4,588,861 | 5/1986 | Teich | 179/99 LS |

Primary Examiner—Robert G. Lev
Attorney, Agent, or Firm—Carothers & Carothers

[57] ABSTRACT

A multi-line, multi-instrument telephone system having no key service unit and wherein decentralized or local indicator lamp and paging circuit management functions are provided which are operative independently in each station set to operate and control the indicator lamps and paging circuits through selective local generation and alteration of control signals and comparison of the control signals with locally generated reference voltage signals to provide basis for decisions on required visual and audible indicator status. The system is connected in loop fashion with each instrument being connected across a common, multiconductor buss wherein a single conductor supports lamp supervision signaling for the multiple lines and another single conductor supports intercom status signaling, intercom audio, paging audio, and the ring signal.

21 Claims, 11 Drawing Figures

MULTI-LINE TELEPHONE SYSTEM

BACKGROUND OF THE INVENTION

In the telephone industry it has long been standard practice to provide multiple line service for a plurality of telephone instruments by use of key telephones which are interconnected through a key service unit or KSU that provides the central intelligence for the system. In such systems, all of the telephone instruments must interface through the key service unit, and several major disadvantages thus arise.

First, all of the telephone instruments in a conventional key system must be wired directly back to the key service unit in a mode of installation called home run wiring. This requirement and the large number of conductors necessary to make the connections for each telephone, significantly complicates system installation and escalates cost. Installation cost and complexity multiply rapidly with increases in the number of lines the system supports due to the fact that additional home run wiring must be provided for each additional line to serve each telephone instrument in the system. Home run installation thus is expensive, complicated, and difficult to manage when considering options for system expansion.

A second disadvantage of the conventional key telephone system is that it inevitably requires a key service unit in addition to the plural telephone instruments. The KSU thus represents an incremental (and often fairly large) cost factor which increases the per-telephone cost of the system. This is an especially troublesome drawback in multiple line systems with only few telephone instruments since the KSU cost must be prorated over a very few telephones.

Among the issued patents dealing generally with telephone systems of the type above described are the following. U.S. Pat. No. 4,410,767 discloses a KSU telephone system in which system operation and control relies on individually predetermined different frequencies of respective telephone sets.

U.S. Pat. No. 4,024,353 discloses a KSU type key telephone system which supports only a single incoming line. U.S. Pat. No. 4,280,022 discloses a KSU type system which is wired in a star configuration. U.S. Pat. No. 4,185,173 discloses a KSU type system in which indicator lamp status information and voice signals are multiplexed to the station sets using differential transformer techniques. U.S. Pat. No. 4,394,544 discloses a non-multiplexed, bused, lamp interconnect scheme in a telephone system which requires a separate conductor for each indicator lamp to be controlled.

U.S. Pat. No. 4,093,830 discloses a conventional KSU type telephone system. U.S. Pat. No. 4,079,212 discloses an extension telephone system which, although it requires a KSU, does not support multiple lines. U.S. Pat. No. 4,004,106 discloses operation of a line circuit for use in a KSU. U.S. Pat. No. 4,013,844 discloses a KSU type telephone system incorporating a double coil relay for control of line circuit operation. U.S. Pat. No. 4,064,373 also discloses a line circuit configuration, as does U.S. Pat. No. 4,101,741. U.S. Pat. No. 4,323,734 discloses circuitry for implementing control signal information on the tip and ring pair of a telephone system by line polarity reversals and DC level changes. U.S. Pat. No. 4,408,102 discloses telephone control circuitry residing in a central PBX or KSU, with signaling based on tone signaling. U.S. Pat. No. 4,382,163 discloses use of a microcomputer to detect and control traditional line circuit functions for station set control.

Other U.S. Pat. Nos. relating to telephone systems generally are: 4,382,163; 4,207,439; 4,374,308; 4,080,517; 4,029,909; and 4,260,857.

BRIEF SUMMARY OF THE INVENTION

The present invention contemplates an improved multi-line telephone system which requires no KSU or other central intelligence and control apparatus as the traditional KSU functions are decentralized in the individual station sets. The improved system preferably is of all solid state components with manual switching and signal initiation being effected by momentary contact switches only. The system in its preferred form is a two line, multi-station system with provisions for decentralized, system-wide paging and intercom control functions at each station set and for decentralized control of visual indicator lamps to indicate, at each station set, line use status for each of the two lines.

The system is installed by bussed loop wiring rather than by traditional home run wiring. The individual station sets are parallel wired across a common multi-conductor bus. The system interfaces with a power source and the CO (central office or Central Exchange) phone lines through a telephone unit which is substantially like the rest of the station sets connected in the system. The system may be readily expanded by addition of units in much the same manner as extension phones have been added in conventional systems, but each system phone, including all such extensions, will support all the features of a conventional key telephone system including multiple lines, intercom, hold, and visual line status indication, by means of decentralized control which eliminates the need for the usual central service unit.

The wiring system which connects this system is an eight conductor bus comprised of two tip and ring pairs for the two CO lines, a power line and a ground line, one conductor for intercom status signaling, intercom audio and page audio, and for the ring signal, and one conductor for the two-line status indicator lamp supervision signaling. Each station set is wired in parallel across this common bus such that connections and system expansion are accomplished as readily as the addition of mere extensions as in standard telephone instrument installations.

Furthermore, in the improved system, indicator lamp and intercom status control signaling is accomplished by the use of an oscillating voltage signal that may by clamped to predeterminable voltage levels by any station set and may also be compared in each station set with locally and independently generated reference voltage levels to determine and implement proper indicator lamp or intercom status. This too contributes to simplified and more reliable system interconnection and permits elimination of the KSU.

The invention will be more readily understood upon consideration of the following detailed description and the accompanying drawings, in which.

Figure 7:
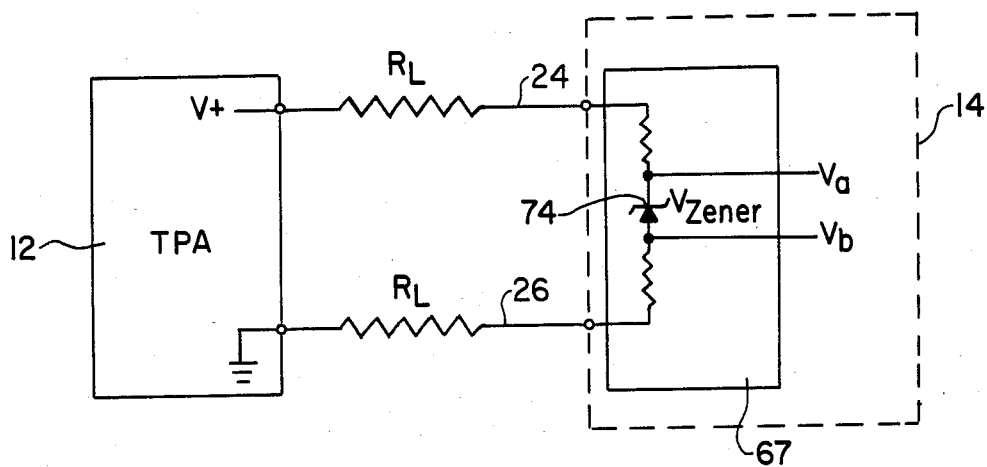
Figure 8:
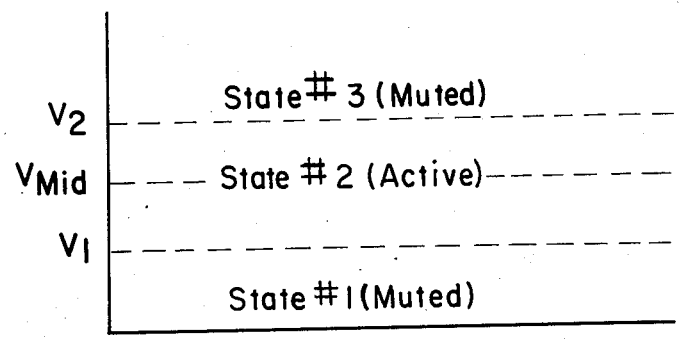
Figure 9:
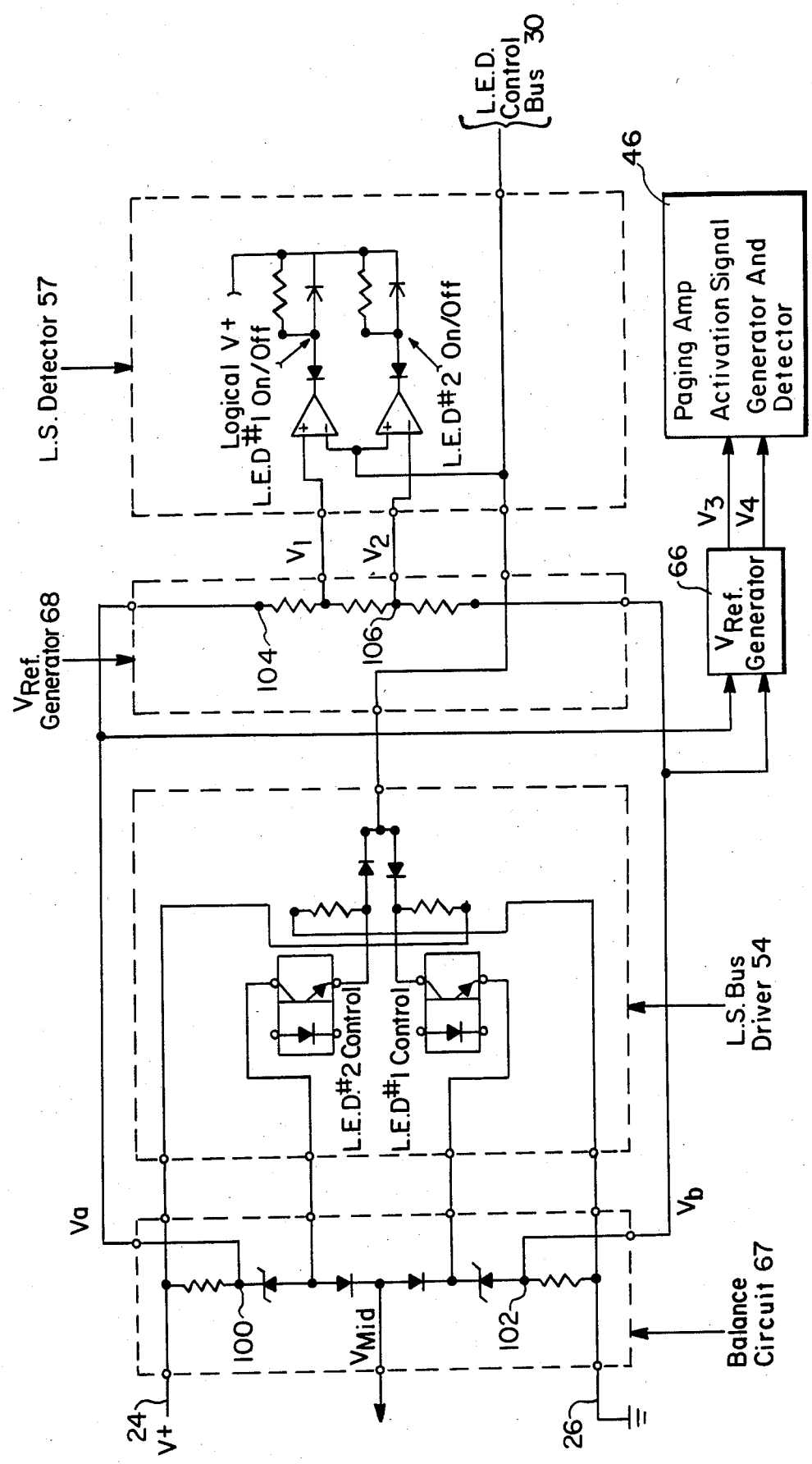
Figure 10:
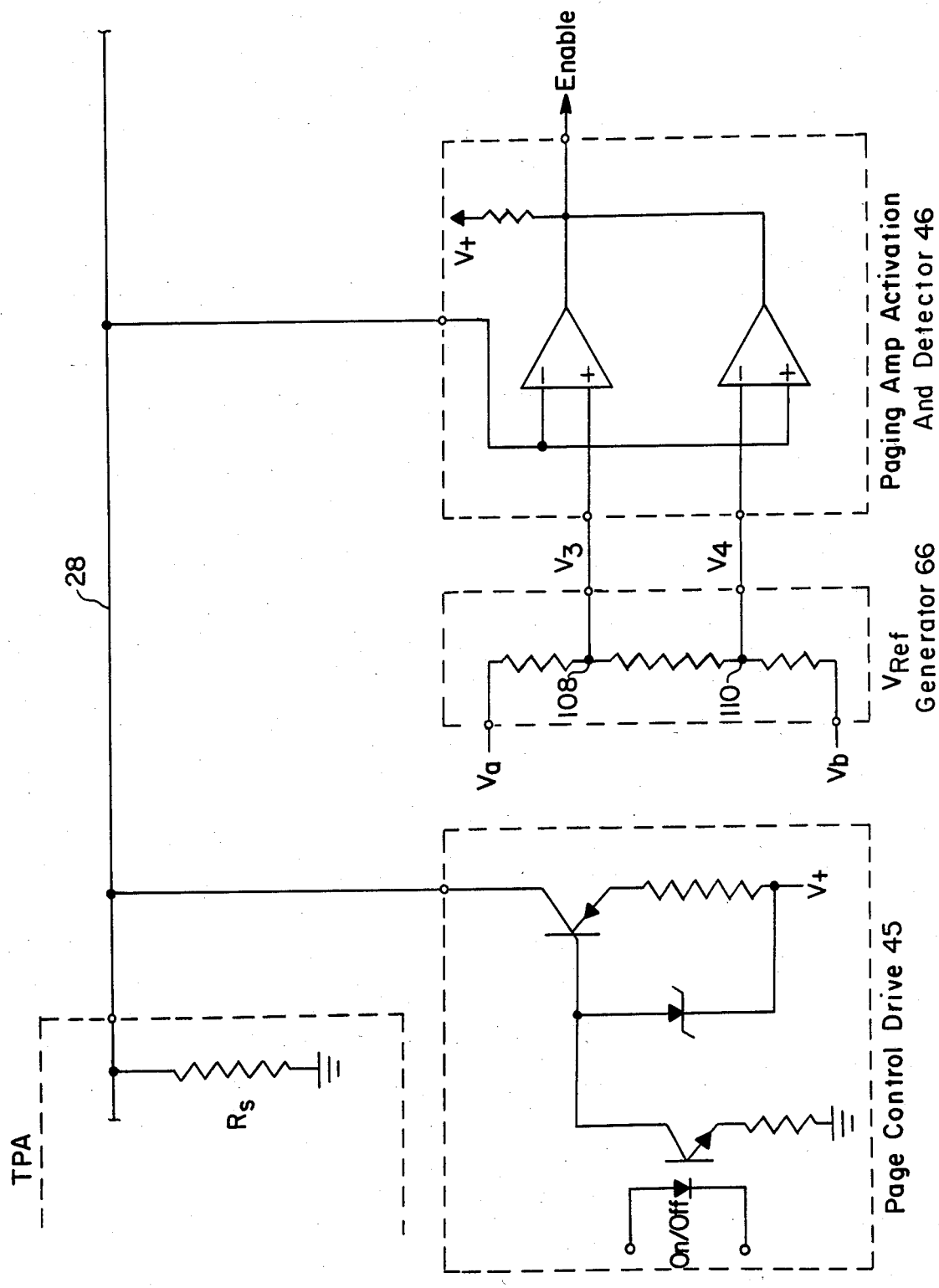
Figure 11:
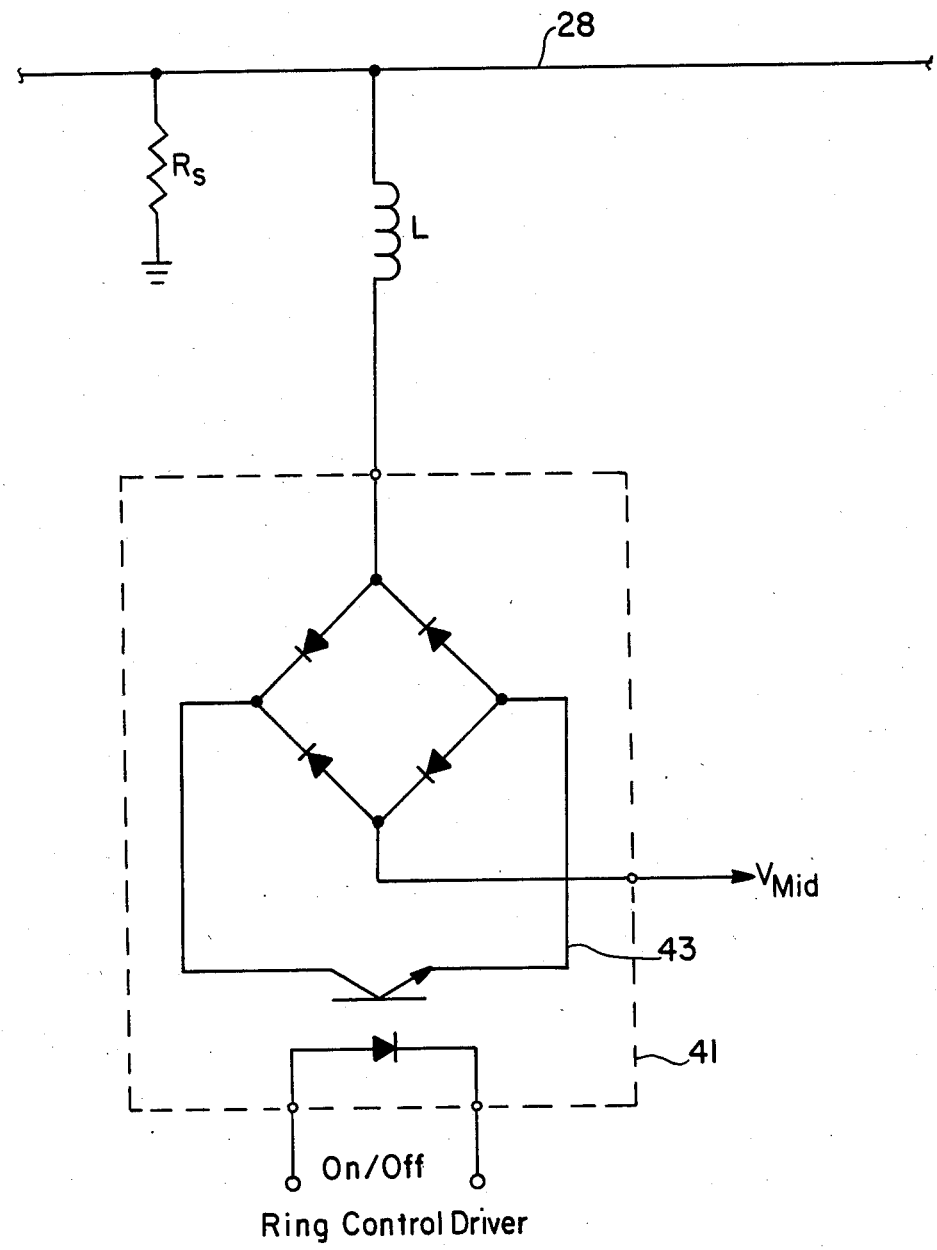

FIG. 7 schematically depicts simplified reference voltage generating circuit for use by the individual station sets of the system in monitoring lamp supervision and other control signals;

FIG. 8 is a diagram which illustrates a mode of intercom control of the invention;

FIG. 9 is a more detailed schematic representation of some circuitry utilized in a presently preferred embodiment of the invention for indicator lamp and page/intercom circuit supervision and control;

FIG. 10 is a detailed schematic representation of block diagram portions of FIG. 9; and FIG. 11 is a detailed schematic representation of further page and ring system control circuitry.

Figure 1:
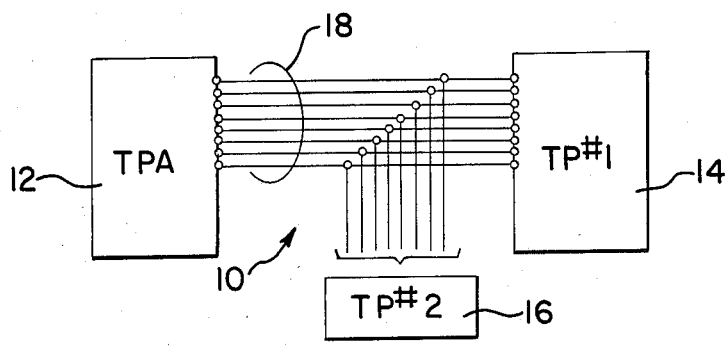
FIG. 1 is a simplified schematic representation of a telephone system according to the present invention.

There is generally indicated at 10 in FIG. 1 a multi-line telephone system of the present invention which comprises a plurality of substantially identical station sets 12, 14, 16 that are parallel wired to an eight-conductor bus 18. Of course, any desired number of station sets may be thus wired to bus 18.

One of the station sets, set 12 for example, is provided with an interface circuit board for the purpose of interfacing the system 10 with telephone company CO lines and a power source, and for originating certain control signals. This station set is designated the "TPA" phone to distinguish it from the others, which are designated as "TP" phones. But for the inclusion of the interfacing circuit board, the TP and TPA units may be identical.

Figure 2:
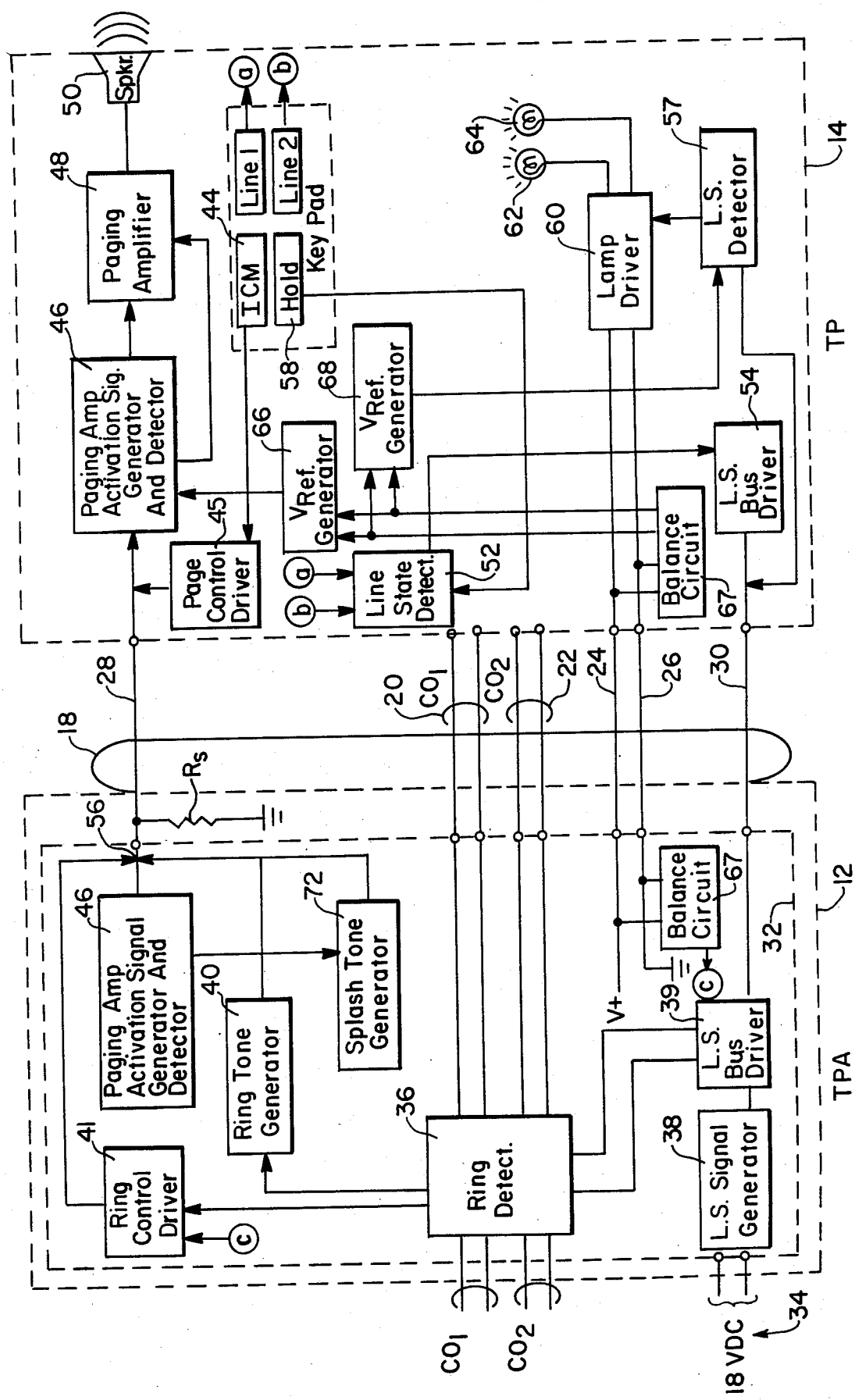
FIG. 2 is a block diagram representation of various functions of interconnected units of the telephone system of FIG. 1.

Referring now to FIG. 2, wherein only elements of the TPA phone and one TP phone are shown, it will be seen in detail how the TPA phone 12 is connected to the TP phone 14 by bus 18. Bus 18 is an 8-conductor cable consisting of two tip and ring conductor pairs 20, 22 which are the central office or central exchange phone lines, designated CO1 and CO2, respectively. Also incorporated in bus 18 are power and ground leads 24, 26 a page, ring, and intercom bus and control wire 28, and a lamp status supervision wire 30.

As above mentioned, within the TPA phone 12 is the interface circuit board 32 which interfaces the system 10 with CO1 and CO2, and with a power source 34. The board 32 includes a ring detector circuit 36, a lamp supervision signal generator 38, a lamp supervision (L.S.) bus driver 39, a ring tone generator 40, and a paging amplifier actuation signal generator and detector 46. Also included are a splash tone generator 72 and a ring control driver 41, both of which drive bus 28 to provide audible ring and page signals.

The TP phone 14 includes a page amp. activation signal and detector circuit 46 which monitors bus 28 and, in response to a voltage signal of specified amplitude detected thereon, actuates the page system amplifier 48 to provide a signal output for driving page speaker 50 with whatever VF or audio signal is present on bus 28.

Similarly, a visual line status indication is provided by a detector 52 in each TP unit which locally monitors the logic state of the instrument and, in response to specified conditions, actuates a lamp supervision (L.S.) bus driver circuit 54, as described in greater detail hereinbelow. The status of the lamp supervision signal, as influenced by bus driver 54 is monitored by a lamp supervision (L.S.) detector circuit 57, which, in response to the L.S. signal detected (FIGS. 3–6), actuates a lamp driver 60 to thereby drive indicator lamps 62 and 64 with the desired indication of line in use or free, and of ringing or hold condition.

The detectors 46 and 57 operate by comparing an input signal against a reference DC voltage which is generated locally in each TP phone by reference voltage generators 66 and 68, respectively.

Also included in each TP phone, and as well in the TPA phone, is a balance circuit 67 which is connected to power leads 24, 26, and is utilized to generate uniform source voltages Va, Vb (FIGS. 9 and 10) for VRef generators 66 and 68, and also in the TPA a voltage signal Vmid for the ring control driver 41 (FIGS. 9 & 11).

The lamp supervision system operates as follows. Since a given CO line is either is use or idle, the indicator lamps of a 2-line system must be able to indicate four states as follows:

1. Lines 1 and 2 idle, both lamps off;
2. Line 1 in use, line 2 idle, lamp 1 on, lamp 2 off;
3. Line 1 idle, line 2 in use, lamp 1 off, lamp 2 on;
4. Lines 1 and 2 in use, both lamps on.

Figure 3:
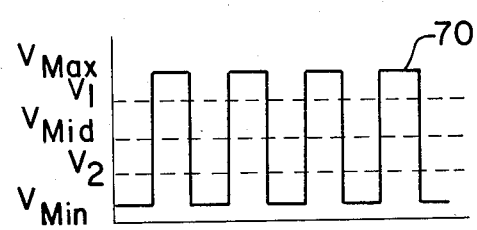
FIGS. 3 through 6 are diagrams of square wave voltage signals utilized in the system for lamp status supervision.
Figure 4:
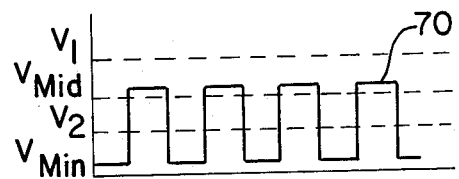
Figure 5:
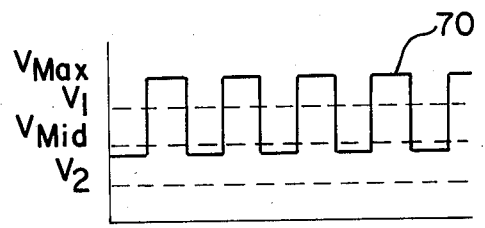
Figure 6:
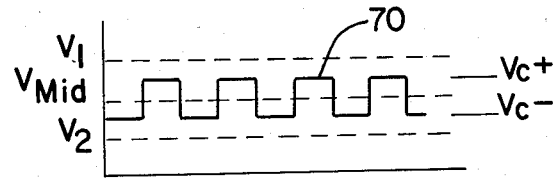

The voltage signal for signaling these conditions in phone system 10 is provided by lamp supervision signal generator 38 in TPA 12 which produces on bus 30 a continuous square wave voltage signal 70 between limits designated Vmin and Vmax as shown in FIG. 3. In each TP phone, CO line state detector 52 detects the logic state of the respective instruments as between CO in-use and idle conditions, and in response to the detected condition causes L.S. bus driver 54 to clamp signal 70 to a mid-range voltage designated Vmid. Thus, when both CO lines are idle, the full wave signal 70 is on bus 30 as shown in FIG. 3. If one CO line is in use, driver 54 clamps one half of the square wave signal 70 to Vmid as shown in FIG. 4, whereas if the other CO line is in use, driver 54 clamps the other half of the square wave signal 20 to Vmid as shown in FIG. 5. Finally, if both CO lines are in use, driver 54 is effective to clamp both wave form halves to Vmid as shown in FIG. 6. Thus, by control of the amplitude of square wave signal 70 in the individual station sets, four CO line status indication signals are provided on a single bus or conductor to supervise indicator lamp operation.

Whenever an indicator lamp 62,64 is to be lighted to indicate a line in use, other visual status information is desirable to distinguish line in use from line ringing and line on hold. Thus, line state detector 52 also detects hold requests for either of lines 20, 22 made by the hold key 58 of any station set. In response, L.S. bus driver 54 is instructed to impress a rapid flashing hold signal on lamp supervision bus 30. This is accomplished in driver 54 by switching the square wave lamp supervision signal between valid states relatively rapidly. In the case of an incoming ring signal, ring detector 36 detects a ring state and instructs L.S. bus driver 39 to switch the square wave lamp supervision signal between valid states at a different switching rate than as described for the visual hold indication, and preferably slower than the hold indication.

For example, if one of lines 20, 22 is ringing, the lamp supervision signal will be switched slowly between the FIG. 3 state (both lamps off) and either the FIG. 4 or FIG. 5 state (one or the other of lamps 62, 64 on) to indicate ringing on the respective line. Similarly, in response to a hold request detected on line 20 or 22 by line state detector 52, L.S. bus driver 54 will switch rapidly between the FIG. 3 state signal and either the FIG. 4 or 5 signal. If both of lines 20 and 22 are ringing, driver 39 slowly switches signal 70 between the FIG. 3 and FIG. 6 states, or for both lines holding signal 70 is rapidly switched between the FIG. 3 and FIG. 6 states. If one line is ringing or on hold while the other is in use, the signal 70 is switched either slowly or rapidly, as required, between the FIG. 6 state, and one or the other of the FIG. 4 and 5 states. Other combinations of status signal switching may be utilized to indicate other valid states, such as one line holding and the other ringing.

Whatever the status of the lamp supervision signal 70, the use of the signal 70 to control lamp operation depends upon the L.S. detector 57 to receive reference voltages V1 and V2 (FIGS. 3 through 6 and FIG. 9) from Vref generator 68, and to repeatedly compare these reference voltages with the square wave signal 70. V1 and V2 preferably exceed Vmin by $\frac{2}{3}$ and $\frac{1}{3}$ of the difference between Vmax and Vmin such that the comparison of V1 and V2 with signal 70 will reveal whether the signal 70 halfwaves cross V1 and V2. In response to this status determination, L.S. detector 57 actuates lamp driver circuit 60 to provide power to lamps 62 and 64 in accordance with the detected status of signal 70.

Operation of the paging system is conceptually similar in many respects to operation of the lamp supervision system. In phone system 10, paging speaker 50 is used for paging and ring tone. When ring detector 36 detects a ring condition on either CO line, ring tone generator 40 is instructed to impress a ring tone signal on page/ring control bus 28 as at 56. Simultaneously, ring control driver 41 impresses a paging amplifier actuation voltage signal on bus 28. The paging amplifier activation signal generator and detector circuits 46 in each station set including the TPA, detect and respond to the ringing status of bus 28 by outputting a signal to command each respective station set paging amplifier 48 to turn on. As the required control signal is multiplexed on bus 28 with the V.F. ring tone signal itself, detectors 46 (high pass filters) are utilized to detect the control signal and actuate the respective station set paging amplifiers 48 and to pass the multiplexed ring signal. The ring tone signal passed by each detector 46 is amplified by the respective paging amplifier 48 and thence is conducted to the respective station set speaker 50 to provide the audible incoming call ring throughout the system 10.

For paging, any station set user can initiate a paging operation by going off hook and pressing the intercom button 44 (ICM) on the keypad to activate paging amplifiers 48, substantially as above described, via generators 46 in the respective station sets. Specifically, in response to pressing of the ICM button 44, the page control driver circuit 45 injects a paging amplifier actuation signal on bus 28. Detectors 46 sense this signal and in response turn on the respective station set paging amplifiers 48. The detector 46 in the TPA (12) also actuates splash tone generator 72 which then injects a V.F. splash tone signal on bus 28. The splash tone signal and the paging amplifier actuation signal are multiplexed on paging/ring bus 28 as above described. Any user who answers the page by actuating his ICM button also injects a control signal via his station set's page control driver 45 and on paging bus 28 which, when added to the control signal injected by the page initiator, results in a control signal that exceeds the upper limit of voltage range within which the paging amplifier is actuated. Accordingly, the paging amplifier is again turned off, and the page initiator and respondent pursue their conversation via their respective hand sets.

The technique used in system 10 for multiplexing a control signal and VF (Voice Frequency) information on one wire, as on the page control wire 28, uses DC signaling superimposed on a VF message. The control signal information is represented by a DC current level. Detectors 46 filter out the VF signal and compare the remaining DC component as current into Rs against two reference voltages, V1 and V2 (FIG. 8) from Vref generator 66 to determine the required state of the page amplifiers 48. The VF signal (page audio, splash tone or ring signal) is filtered by a high pass filter which passes all components above 50 Hz.

The following states define all of the valid control signaling conditions on paging control wire 28:

State 1: Paging Amplifier Muted #1 Vcontrol less than V1

State 2: Paging Amplifier Active Vcontrol between V1 and V2

State 3: Paging Amplifier Muted #2 V2 less than Vcontrol where V1 and V2 are the reference voltages generated by generator 66.

With reference to FIG. 8, page control wire 28 is normally in state 1 as the control voltage is less than V1, and all the paging amplifiers 48 are disabled or muted. Upon initiation of a paging operation via ICM button 44, the page control driver 45 in the originating station set injects a constant current signal on page control wire 28. This current is sinked at TPA phone 12 into a known resistance Rs, and the calibrated current is set such that the DC voltage sensed by detectors 46 on the line 28 puts the line into State 2 to actuate the paging amplifier 48 and thereby output an audible splash tone paging call. If the calling operator hangs up, the control signal is interrupted and page line 28 returns to State 1 (paging amp. muted). If instead another party picks up his phone and actuates his ICM button 44 to answer the page call, then his station set also injects the same calibrated current onto page wire 28. This has the effect of raising the DC voltage on line 28 into state 3 to again deactivate paging amplifier 48. Note that by using current sources for page control signals, the impedence of the paging control line 28 remains high. This facilitates the task of impressing audio on the same line.

Paging audio is also carried on page wire 28. This is possible because the amplitude of the audio signal is set to be less than V2 minus V1 (volts peak to peak). It is therefore possible to use the single wire 28 for the dual functions of control and signal transmission.

When TPA phone 12 transmits ring tone, the ring control driver 41 similarly forces paging control wire 28 into State 2 and generator 40 injects ring tone onto wire 28. Again, the amplitude of the ring tone signal is controlled such that it is less than V2 minus V1. The circuitry used to force the paging control line into State 2 (for ringing) does so by closing a solid state switch circuit 43 (FIG. 11). An inductor L is connected from bus 28 through the switch 43 to Vmid (which is generated by the balance circuit 67). The forcing action overrides the operation of the page signaling system by utilizing the DC low impedence characteristic of Vmid to force wire 28 into state 2 irrespective of page system status. At the same time, line 28 is available for audio because of the AC characteristics inherent in the series inductor L.

As has been explained, the reference voltages by which detectors 46 and 57 determine paging and lamp control line status are generated locally in each TP and TPA station set using TPA power input delivered via Wires 24 and 26.

The circuit shown in FIG. 7 represents a simplified theoretical scheme used in balance circuits 67 to provide consistent voltage signals in the face of varying line losses and the lack of a common ground potential. These voltage signals (Va, Vb) are utilized by generators 66, 68 to provide the requisite reference or threshold voltages V1–V4.

All power for the station sets 14, 16, etc. used in the system 10 comes from TPA phone 12. Since the station set phones can be located some distance from the TPA phone 12, appreciable line losses are not uncommon. In FIG. 7, the resistors R1 are meant to represent the series resistance encountered on lines 24, 26. Due to the nature of the bus 18, the series resistance on power lead 24 and on return or ground lead 26 is equal. The circuit in FIG. 7 takes advantage of that balance to cancel out the effects of the line losses.

The system is designed such that the power voltage V+ from TPA phone 12 is greater than the sum of the zener voltage of zener diode 74 plus two times the line loss voltage. Given this condition and the balanced nature of the bus, it can be shown from the network equations that $Va = V+ + Vzener/2$ and $Vb = V+ - Vzener/2$. Note that neither Va or Vb depends on the series line resistance R1. This allows generators 66, 68 in all of the station sets in the system to generate precise reference voltages V1 and V2, V3 and V4, without need of a common ground potential.

The presently preferred circuitry for driving and detecting busses 28 and 30 is shown in FIGS. 9 and 10. In FIG. 9, a balance circuit 67 is shown connected across the bus leads 24 and 26. The voltages Va and Vb are taken from points 100, 102 and are provided to the Vref generators 66 and 68. Also connected to balance circuit 67 and to bus leads 26, 28, is L.S. bus driver 54.

Each of Vref generators 68, 66, is a series of three resistances across Va, Vb, and reference voltage pairs are taken between the series resistances. In generator 68 (FIG. 9) V1 and V2 are taken at points 104, 106. Similarly in generator 66 (FIG. 10) reference voltages V3 and V4 are taken at points 108, 110.

Reference voltages V1 and V2 are utilized by the circuitry of L.S. detector 57, in conjunction with sensing of the condition or status of bus 30 to control LED status as above described. Similarly, V3 and V4 are utilized by detector 46 (FIG. 10) in conjunction with sensing of the condition of bus 28 to control paging amplifiers 48.

Also shown in FIG. 10 is a schematic representation of the page control driver 45, whose function parallels that of ring control driver 41 as described hereinabove.

According to the description hereinabove, the present invention provides a novel and improved multiline, multistation telephone system having simplified connections and decentralized control functions by which the traditional key service unit normally associated with such systems is eliminated without sacrifice of any of the desirable operational features of a key system. The invention has been illustrated and described with reference to a presently preferred embodiment thereof. Those skilled in the art will appreciate that the invention may be practiced in various alternative and modified embodiments without departing from the essence thereof. Accordingly, it is intended that the invention be construed as broadly as permitted by the scope of the claims appended hereto.

We claim:

1. A multi-line telephone system comprising:
   a plurality of telephone station sets operably connected together;
   at least one of said station sets being adapted to interface with telephone CO lines;
   at least one of said station sets being adapted to interface with a common power source;
   a bus means operably connecting said station sets together in bussed loop fashion;
   said bus means including at least one status signal conductor for providing CO line status information to said station sets;
   each said station set having drive circuit means for impressing variable value CO line status signals on said one status signal conductor in accordance with the line status imparted by the respective said station set, and detector circuit means for detecting the varying values of such a line status signal;
   reference voltage generating means located in each said station set and independently operable from such a common power source to generate in each said station set reference voltages for comparison with such a line status signal by said detector circuit means to determine CO line status; and
   each said station set further including indicator means which are operable in response to the line status signal detected by the said detector circuit means of the respective said station sets to inform users of said respective station sets of CO line status.

2. The telephone system of claim 1 wherein said reference voltage generating means includes a balancing circuit means in each said station set which is operable from such a common power source to provide in each respective station set consistently uniform source voltages.

3. The telephone system of claim 2 wherein said reference voltage generating means further includes a reference voltage circuit in each said station set for generating predeterminable threshold voltage signals from the uniform source voltages generated by the respective said balancing circuit.

4. The telephone system of claim 3 wherein each said reference voltage circuit comprises series resistances which are imposed across the respective said uniform source voltages, and said threshold voltage signals are taken from points intermediate said series resistances.

5. The telephone system of claim 4 wherein said at least one status signal conductor includes a pair of status signal conductors comprised of a lamp supervision conductor and a page and ring supervision conductor.

6. The telephone system of claim 5 wherein each said station set includes a separate driver circuit means corresponding to each of said status signal conductors and a separate detector circuit means corresponding to each of said status signal conductors.

7. The telephone system of claim 6 wherein one of said status signal conductors is a lamp supervision conductor which carries a square wave voltage signal and the respective driver circuit means is operable to clamp said square wave signal in any of a plurality of wave configurations corresponding to the respective CO line use status lamp indications.

8. The telephone system of claim 7 wherein said plurality of wave configurations is such that each may be uniquely identified by comparison thereof in each said station set with a pair of different DC threshold voltage signals which are generated in the respective said station set by the respective reference voltage generating means.

9. The telephone system of claim 8 wherein said plurality of wave configurations is sufficient to uniquely define all possible use status configurations of a pair of CO lines.

10. The telephone system of claim 9 wherein said plurality of wave configurations is four configurations corresponding to four states of CO lines utilization for such a pair of CO lines including both of the CO lines idle, both of the CO lines in use, and either one of the lines in use while the other is idle.

11. The telephone system of claim 10 wherein said four wave configurations include full wave voltage, upper half wave clamped to an intermediate voltage, lower half wave clamped to said intermediate voltage, and both half waves clamped to said intermediate voltage.

12. The telephone system of claim 11 wherein said pair of different DC threshold voltages includes a first reference voltage between said intermediate voltage and said upper half wave voltage, and a second reference voltage between said intermediate voltage and said lower half wave voltage.

13. The telephone system of claim 12 wherein the detector circuit means corresponding to said lamp supervision conductor is operable to selectively energize and extinguish indicator lamps for each said CO line to indicate use and non-use thereof.

14. The telephone system of claim 13 wherein said driver circuit means in each said station set corresponding to said lamp supervision conductor is operable to switch said square wave voltage signal among said four states to provide at least a pair of flashing lamp status indications for further definitions of CO line utilization status.

15. The telephone system of claim 14 wherein said further CO line utilization status includes line holding and line ringing.

16. The telephone system of claim 15 wherein the other of said status signal conductors is a page and ring supervision conductor which carries page and ring audio signals and page amplifier actuation signals, and the respective driver circuit means includes a ring control driver circuit which impresses a page amplifier actuation signal on said page and ring supervision conductor in response to detection of incoming call ring on either of said pair of CO lines, and a page control driver in each said station set which impresses a page amplifier actuation signal on said page and ring supervision conductor in response to initiation of a paging operation by the station set user.

17. The telephone system of claim 16 wherein the said detector circuit means in each said station set corresponding to said page and ring supervision conductor includes high pass filter means for passing V.F. audio signals to the respective said paging amplifier while filtering said paging amplifier actuation signals.

18. The telephone system of claim 17 wherein said detector circuit means in each station set corresponding to said page and ring supervision conductor is operable to compare the paging amplifier actuation signal on said page and ring supervision conductor with a pair of different threshold voltages which define a range of actuation signal values and to actuate said paging amplifier in response to presence of a paging and ring signal within said range.

19. The telephone system of claim 18 wherein said page control drivers generate paging amplifier actuation signals which are additive on said page and ring supervision conductor such that simultaneous page operations at two of said station sets produces a paging amplifier actuation signal which exceeds said range and said paging amplifier is muted.

20. In a communications apparatus wherein a plurality of telephone station sets are operably interconnected to provide a multi-line, multi-station telephone system with at least one station set adapted to interface with telephone CO lines to provide multi-line capability for all of the station sets and with at least one station set being adapted to interface with a power source, and wherein each respective station set includes intercom capability for intercom communication with any other of the station sets and further includes system wide line status supervision and indication, the improvement comprising:

said station sets being operably interconnected by a cable bus having no more than eight electrical conductors.

21. The improvement as claimed in claim 20 wherein the line status supervision and indication in each respective station set includes indicator means for indication of CO line status which are operable in response to comparison between variable value CO line status signals generated by drive circuit means in any of the station sets and a reference signal generated by generating means in the said respective station set.

* * * * *